Dec. 30, 1952 CHI LIANG CHO 2,623,695

COMPOUND DIFFERENTIAL ACTUATOR AND TRANSFER MECHANISM

Filed Aug. 27, 1946 7 Sheets-Sheet 1

Inventor:
Chi Liang Cho
By E. F. Wenderoth
Atty

Inventor:
Chi Liang Cho
By E. F. Wenderoth
Atty

Dec. 30, 1952 CHI LIANG CHO 2,623,695

COMPOUND DIFFERENTIAL ACTUATOR AND TRANSFER MECHANISM

Filed Aug. 27, 1946 7 Sheets-Sheet 3

INVENTOR.
Chi Liang Cho
BY
Michael S. Striker

COMPOUND DIFFERENTIAL ACTUATOR AND TRANSFER MECHANISM

Filed Aug. 27, 1946 7 Sheets-Sheet 4

Inventor:
Chi Liang Cho
By E. F. Wenderoth
Atty

Dec. 30, 1952 CHI LIANG CHO 2,623,695

COMPOUND DIFFERENTIAL ACTUATOR AND TRANSFER MECHANISM

Filed Aug. 27, 1946 7 Sheets-Sheet 5

Inventor:
Chi Liang Cho
By E. F. Wenderoth
Atty

Dec. 30, 1952 CHI LIANG CHO 2,623,695

COMPOUND DIFFERENTIAL ACTUATOR AND TRANSFER MECHANISM

Filed Aug. 27, 1946 7 Sheets-Sheet 6

Inventor:
Chi Liang Cho
By C. F. Wenderoth
Atty

COMPOUND DIFFERENTIAL ACTUATOR AND TRANSFER MECHANISM

Filed Aug. 27, 1946

7 Sheets-Sheet 7

Inventor
Chi Liang Cho
By G. F. Oberdorfer
Atty

Patented Dec. 30, 1952 2,623,695

UNITED STATES PATENT OFFICE 2,623,695

COMPOUND DIFFERENTIAL ACTUATOR AND TRANSFER MECHANISM

Chi Liang Cho, Zurich, Switzerland

Application August 27, 1946, Serial No. 693,183
In Switzerland March 22, 1944

4 Claims. (Cl. 235—82)

The present invention relates to improvements in calculating machines.

An object of the invention is to produce a machine of simple and compact design, efficient in operation, durable and which may be manufactured at low cost.

It is another object of the invention to provide a calculating machine in which differential actuator bars are mounted for differential longitudinal movement to actuate a register, and are tiltable about a longiudinal axis to cause an additional increment of longitudinal movement for effecting a tens-transfer.

It is a further object of the invention to provide stop means limiting movement of the actuator bars when in said tilted position to one unit differential distance.

It is still a further object of the present invention to provide means for tilting each actuator bar when the numeral wheel of the next lower order forming part of the register passes through zero position.

With the above and other objects in view which will become apparent from the following detailed description, a preferred embodiment is shown in the drawings in which.

Figure 2:
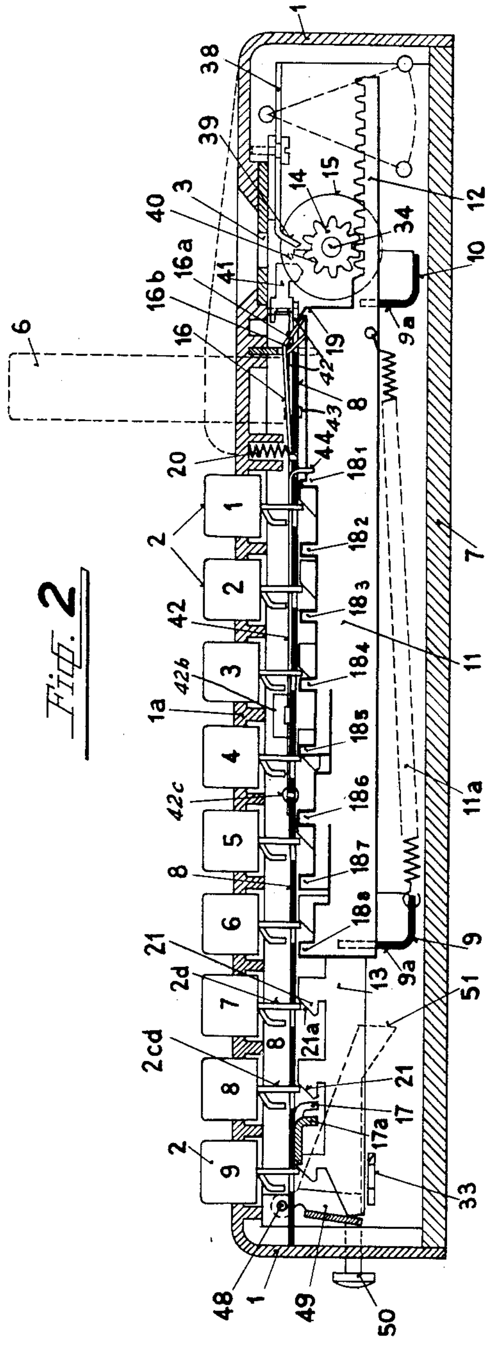
Fig. 2 is a cross-sectional view taken on the section line 2—2 of Fig. 1.
Figures 2A, 2B, 2C, 2D:
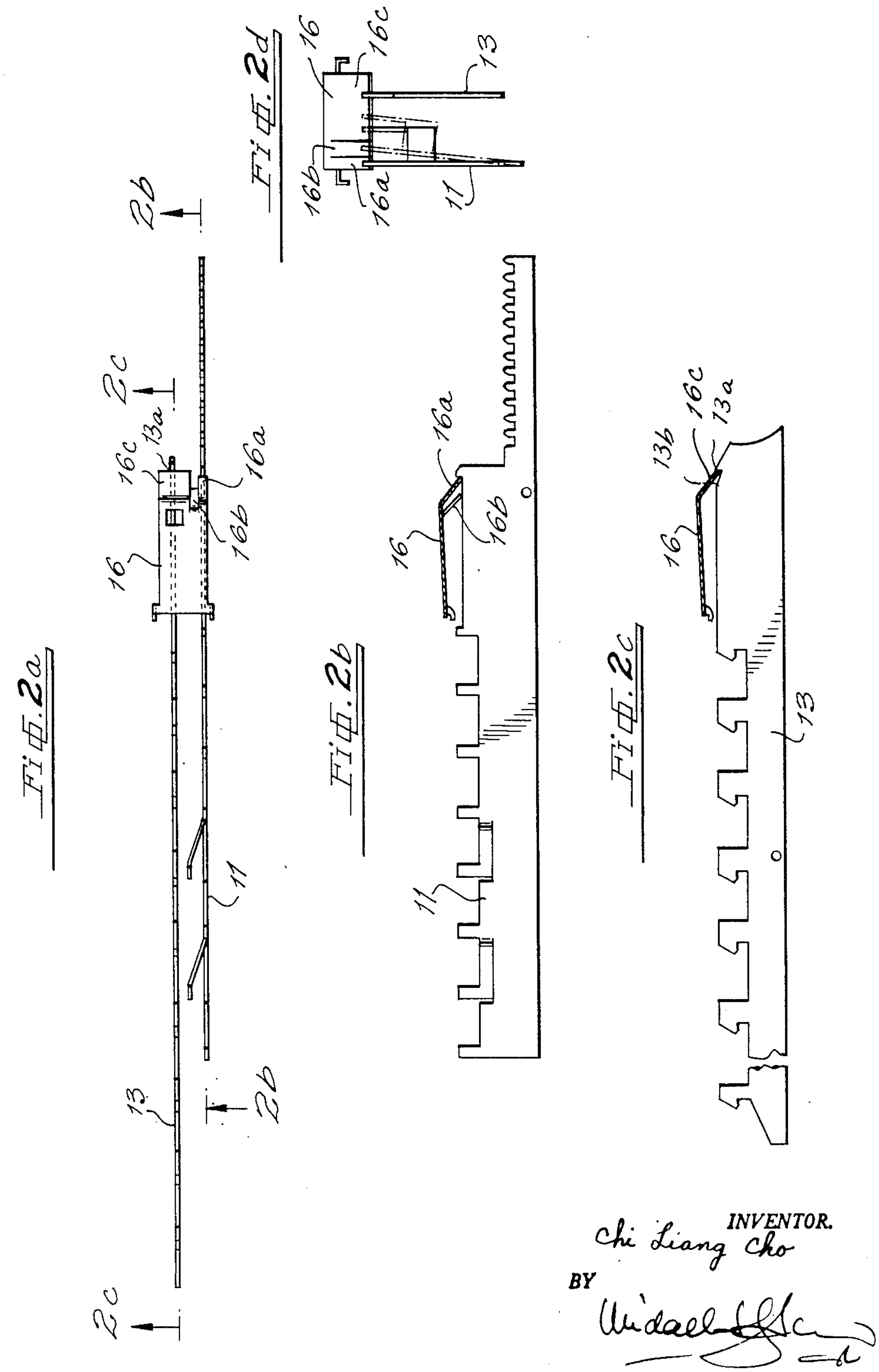

Fig. 2*a* is a plan view of the arrangement of pawl 16;

Fig. 2*b* is a sectional view of the arrangement shown in Fig. 2*a* on line **2*b*—2*b***;

Fig. 2*c* is a sectional view of the arrangement shown in Fig. 2*a* on line **2*c*—2*c***;

Fig. 2*d* is a side view of the arrangement shown in Fig. 2*a*.

Figure 1:
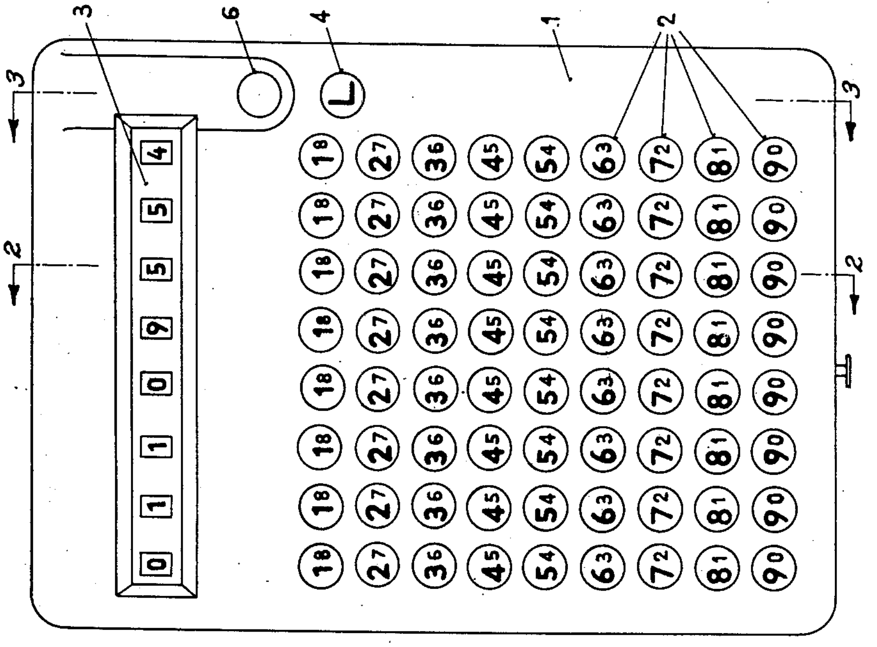
Fig. 1 is a plan view of the machine.
Figures 3, 4, 4A, 4B, 4C, 5, 6, 6A:
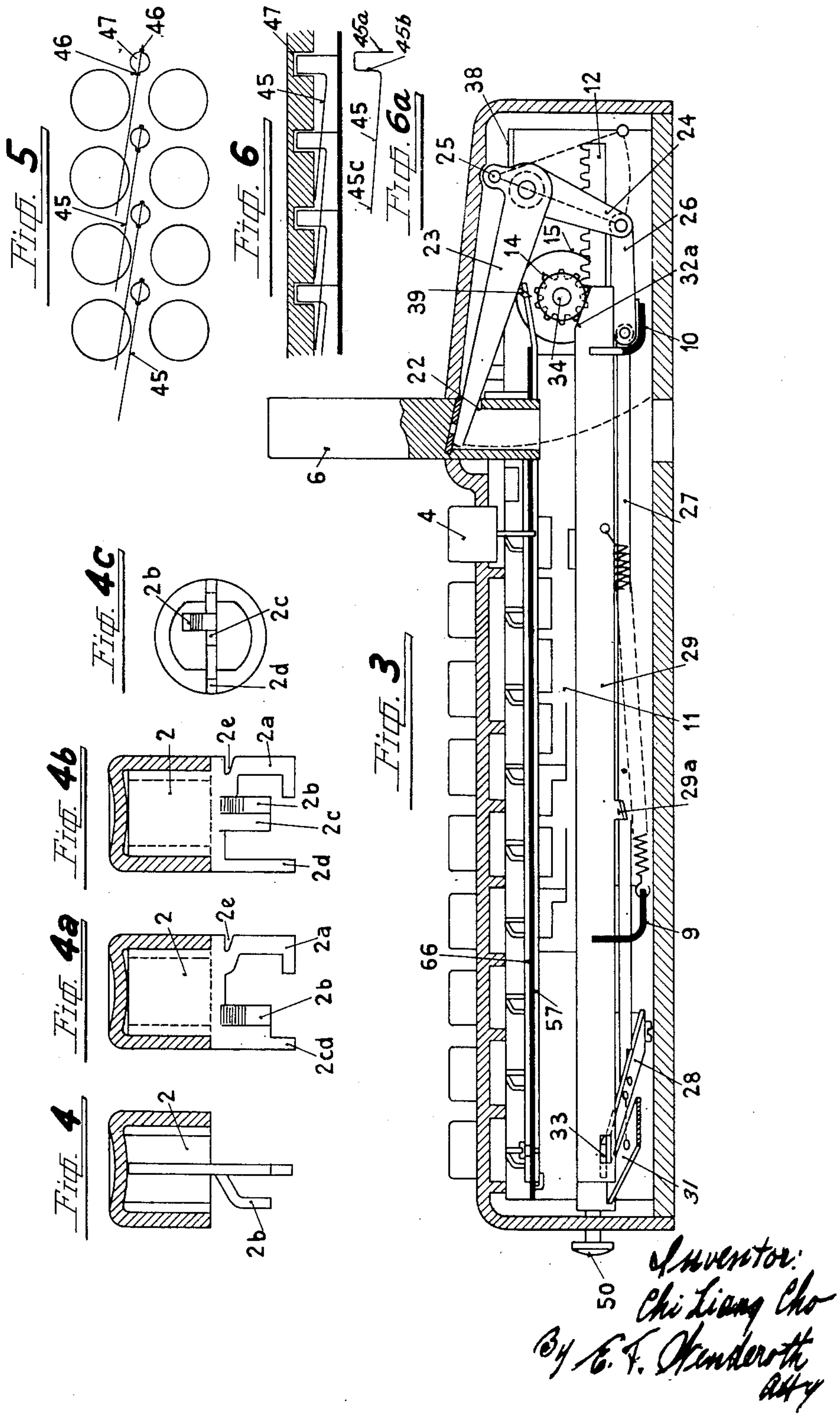

Fig. 3 is a similar sectional view taken on the section line 3—3 of Fig. 1.

Fig. 4 is a cross-sectional view of a key and stem.

Fig. 4*a* is a cross-sectional view of a key and stem taken at right angles to the view shown in Fig. 4.

Fig. 4*b* is a cross-sectional view similar to Fig. 4*a* of certain keys and stems.

Fig. 4*c* is a bottom plan view of the key and stem shown in Fig. 4*b*.

Fig. 5 is a partial diagrammatical view illustrating the manner of mounting the keys in the keyboard.

Fig. 6 is a partial cross-sectional view illustrating the mounting of the springs in the cover plate which coact with the keys.

Fig. 6*a* is a diagrammatical view of one of the springs coacting with the keys.

Figure 7:
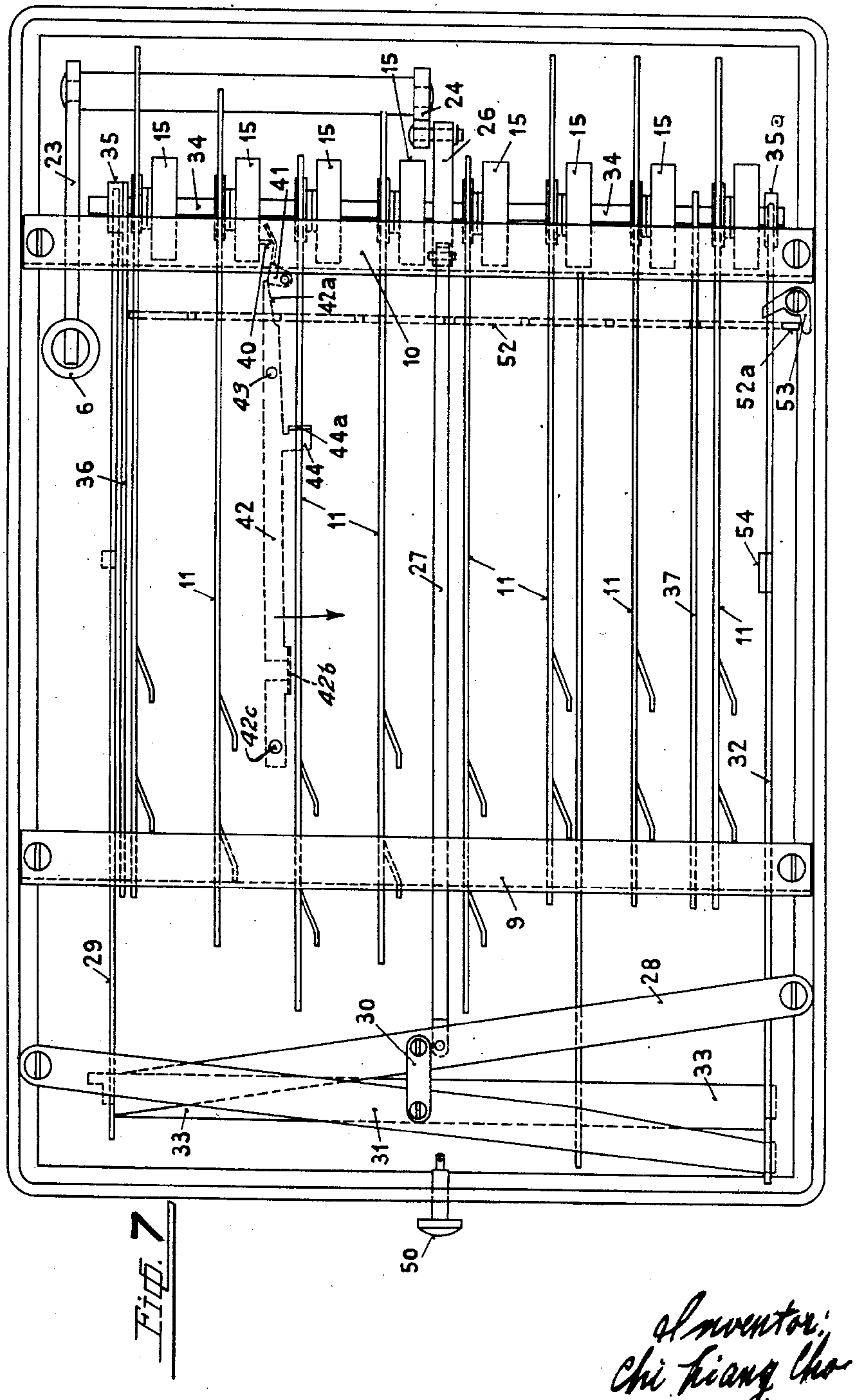

Fig. 7 is a bottom plan view of the machine with the bed plate removed.

Figures 8, 9, 10, 11, 12, 13, 14:
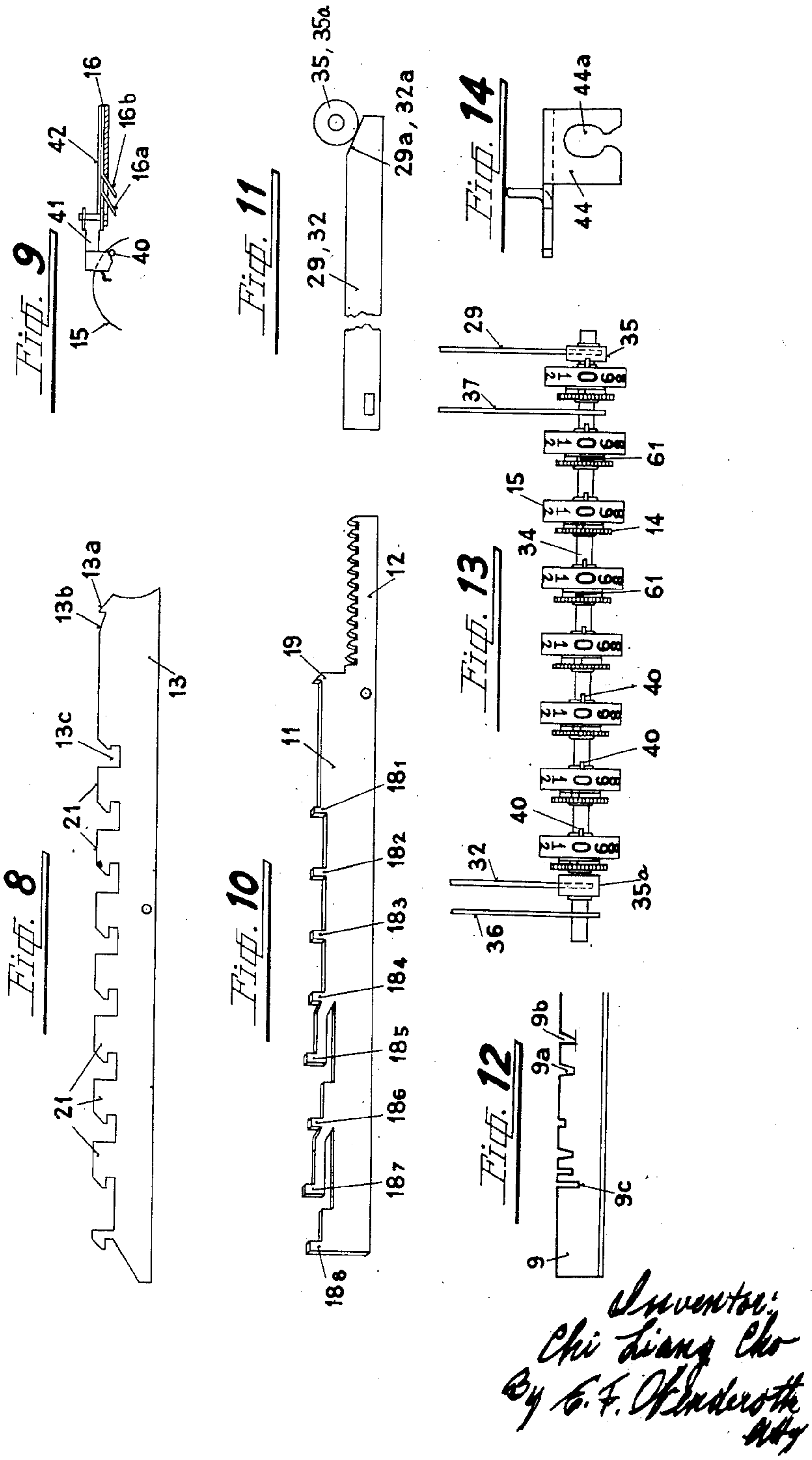

Fig. 8 is a side elevational view of one of the key latch plates or bars.

Fig. 9 is a partial cross-sectional view illustrating a portion of the transfer mechanism and the pawls cooperating with the actuating plates.

Fig. 10 is a side elevational view of an actuating plate or bar.

Fig. 11 is a partial side elevational view of a reciprocable operating rail actuated by the driving mechanism.

Fig. 12 is a partial elevational view of one of the cross bars with the various notches therein in which the key latch and actuating plates are supported.

Fig. 13 is a partial top plan view of the number wheels and actuating pinions associated therewith.

Fig. 14 is an elevational view of a detail of the transfer mechanism.

Figures 15, 16, 17, 18:
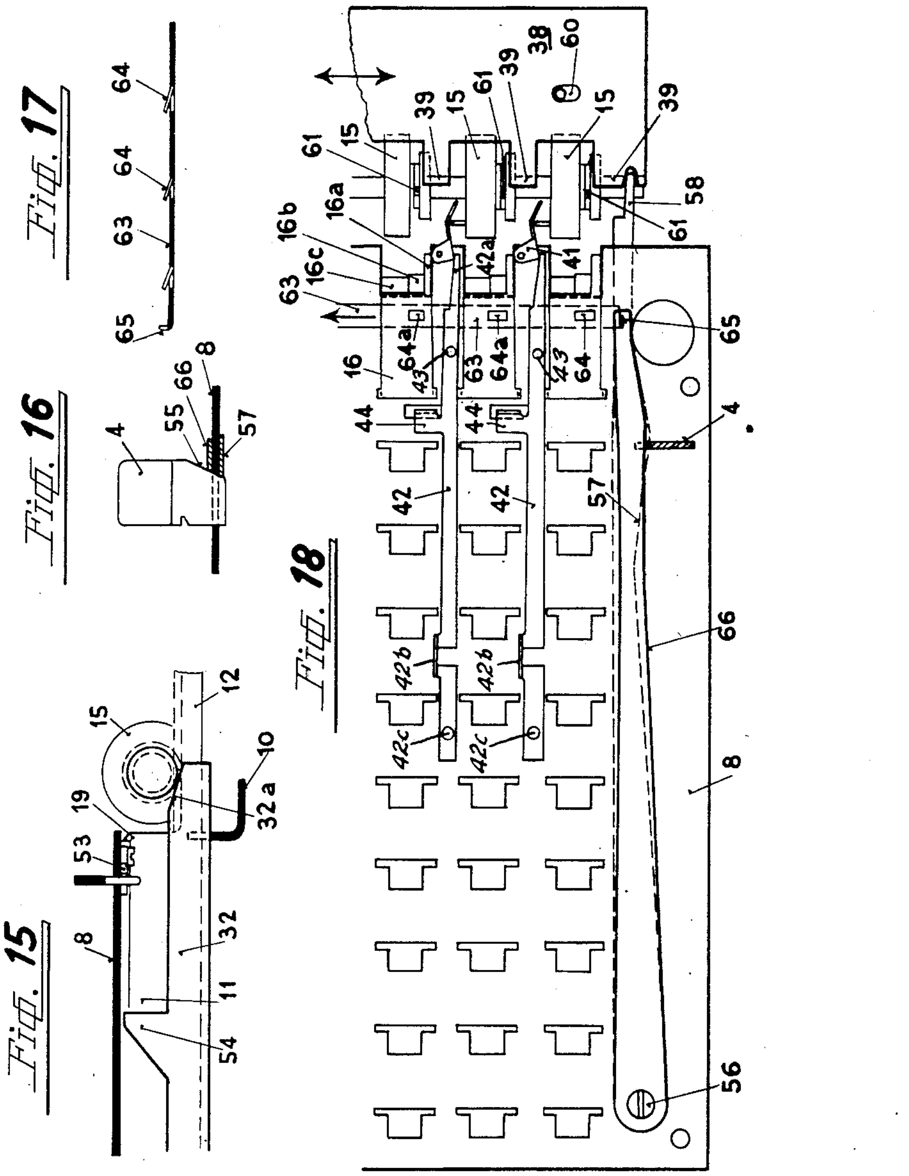

Fig. 15 is a partial side elevational view illustrating a reciprocable operating rail with the lug construction thereon cooperating with the transfer mechanism.

Fig. 16 is a partial side elevational view of the accumulator resetting and subtraction keys and cooperating elements.

Fig. 17 is a partial side view of the cross-bar for releasing the actuating plates when the accumulator is reset to zero and Fig. 18 is a partial top plan view of the bearing or support plate of the machine with elements associated therewith.

As seen in Fig. 1, a key board comprising eight columns of digit keys having the digits "1" to "9" for addition and "0" to "8" for substraction, is provided on the case 1 as well as a sight 3 for viewing the accumulator values. A resetting key 4 for the accumulator and the operating key 6 are disposed on the right-hand side of the key board.

The case 1 is supported on a base plate 7 and secured thereto in any desired manner.

A support plate 8 is secured to the case 1 underneath the cover **1*a* and extends parallel thereto. Two transverse angle bars 9 and 10 are secured to the side walls of the case 1**.

All the parts necessary for the calculating operation, the drive, the setting and clearing of the key board and the counter are mounted on the cover **1*a*, the support plate 8 and the two bars 9 and 10**.

The setting keys 2—of which a nine-key column is shown in Figs. 2 and 3—are mounted and guided so as to be vertically reciprocable in the cover 1a. The stem portions of the keys 2 which will be described hereinafter, are adapted to operatively engage, on the one hand, with an actuating plate 11 with a rack extension 12 and, on the other hand, with a key latch plate 13. The rack extension 12 of the actuating plate 11 cooperates with the actuating pinion 14 of a number wheel 15 which is rotatably mounted below the sight 3 (Figs. 1 and 2).

The stems of the keys 2 are guided in the cover 1a, and are held in their upper position by the springs 45 (Fig. 5) which at the same time serve for restoring them to normal position after being depressed. The springs 45 are made of spring wire, and comprise (Fig. 6A) a U-shaped stirrup portion of which one leg 45a is prolonged, while the other leg 45b is bent approximately at right angles to form an extension 45c. The stirrup portions of the springs 45 are plugged into the diametrical slots 46 provided in the bores 47 in the cover 1a so that the free end of the leg 45a contacts the support plate 8. Upon assembling the keys, the spring end 45c is first pushed sideways from the key stem, and when the key is fully inserted into its bearing in the cover 1a, the spring end 45c snaps into a lateral notch 2e (Figs. 4a and b) provided in the key stem, whereupon the key is spring-supported in its bearing in the cover 1a.

The number of actuating plates 11 with rack extensions 12, key latch plates 13 and counters 15 with pinions 14, all mounted side by side, is of course equal in number to the key columns which in the example shown and described is eight.

A multiple fingered pawl 16 is associated with and cooperates with each set of actuating plates 11 and key latch plate 13, the purpose and function of which will be described hereinafter.

The latter together with the rack extensions 12 are formed as flat plates, and are longitudinally displaceable in V-notches 9a (Fig. 12) of the angle bars 9 and 10. The notches also permit rocking or tilting of the plates 11 on their lower or bearing edges through an angle wherein positive engagement of the rack 12 with the pinion 14 which is sufficiently wide is maintained. Springs 11a, secured to the cross bar 9, engage the plates 11 and urge the latter forwardly away from the counter wheels 15 into abutment against a fixed cross rod 17 which defines the fully advanced position of the plates 11.

The actuating plates 11 are provided with eight lugs or dogs $18_1$—$18_8$ and with a projection 19 at their rear ends. In their rearward position the plates 11 are in normal position, and are held in such position by the springs 11a and a pawl finger 16a of panel 16 engaging the projection 19 (Fig. 2).

The multiple fingered pawl 16 is made of a strip of metal having a bent forward edge which is inserted into a slot provided in the bearing plate 8, and which is held therein by a helical spring 20 mounted in the cover 1a. The multiple fingered pawl 16 (Figs. 2 and 18) is of a width somewhat greater than the distance between the actuating plate 11 and the latch key plate 13 associated therewith. At its rear end, the pawl 16 projects beyond the end of the bearing plate 8, and is provided in addition to pawl finger 16a with two other pawl fingers 16b and 16c adjacent one another, pawl finger 16b being set back from pawl 16a by the ratching distance, i. e. the path covered by the actuating plate 11, when the wheel 15 (as seen through the sight 3) has been turned a digital distance. The pawl finger 16b serves for transferring the tens-digits, and its function will be explained hereinafter in connection with the decimal transfer. The pawl finger 16c (Figures 2a and 18) is disposed above the key latch plate 13, and in normal position rests in a notch 13b located in back of a projection 13a of the latch plate 13 (Fig. 8). The key latch plates also are mounted, longitudinally displaceable and transversely tiltable or rockable about their bottom edges, in V-notches 9b of the cross bars 9 and 10. The latch plates 13 are provided (Figs. 2 and 8) with dogs 21 having an inclined control edge 21a. The number of the said dogs 21 corresponds to the number of keys 2 in a column, i. e. nine, and they are so disposed that, when the latch plate 13 is in normal position, with the pawl finger 16c engaged with the projection 13a, the inclined edges 21a may be contacted by the corresponding control lugs 2a of the key stems (Fig. 2).

The drive element of the machine, key 6, is vertically reciprocable under spring action, in the cover 1a of the case 1. The arm 23 of a bell-crank lever 23, 24 engages in a slot 22 (Fig. 3) in the key 6, and the lever pivots on a pin 25 secured in the case 1. A link 26 is pivoted to the free end of the arm 24 and to a rod 27 leading to the front portion of the case 1. The rod 27 engages an operating lever 28 (Figs. 3 and 7) which at one end is pivoted in a side wall of the case 1 and at the other end engages a slot in a reciprocable operating rail 29. The latter is mounted parallel to the actuating plates 11 and the latch plates 13 and longitudinally displaceable in notches 9c, of the cross bars 9 and 10. A short link 30 is pivoted at one end to the operating lever 28 and, at the other end, to a second operating lever 31, approximately at their mid points. The second lever 31 is pivoted at one end to the other side wall of the case 1, and at its other end engages in a slot of a second reciprocable operating rail 32 which also is longitudinally displaceable in the cross bars 9 and 10. A transverse bar 33 is secured at each end to the rails 29 and 32 and forms therewith a general operating bail which is located within the path of travel of the actuating plates 11, but immediately below the bottom edge of the key latch plates 13. The rails 29 and 32 at their forward ends are provided with inclines 29a and 32a (Figure 11). Rollers 35 and 35a (Figs. 7, 11 and 13) are mounted on the accumulator shaft 34 at the elevation of the rails 29 and 32. The accumulator shaft 34 is journaled in longitudinally extending bars 36 and 37 (Figs. 7 and 13) which may be moved up and down in the transverse angle bar 9 and guided in the transverse angle bar 10. The shaft 34 is spring-loaded so as to be constantly urged downwardly to engage the pinions 14 with the racks 12 of the actuating plates 11.

A transverse plate 38 with downwardly bent prongs 39 (Figs. 2, 3 and 18) is mounted in the case 1 above the counter wheels 15 and their associated pinions 14. The prongs 39 engage the pinions 14 when the shaft 34 is raised by the inclines 29a and 32a of the rails contacting the rollers 35 and 35a.

The parts and portions described so far permit, in a general way and manner, carrying out a calculating operation as follows:

Assuming that the value "7" is to be transferred to a counter wheel 15 and that the associated actuating plate 11 is in its normal position, i. e. locked in its rearward position (Fig. 2)

by the pawl finger 16a engaging the projection 19, the key 2 with the value "7" is depressed, and the vertical hooked-lug portion 2a of its stem contacts the inclined edge 21a of the corresponding dog 21 of the associated key latch plate 13. Before the stem portion 2a has reached its lowest position, the front incline of the notch 13b (Fig. 8) of the key latch plate 13 has raised the associated pawl plate 16. Thereby the pawl finger 16a is raised and disengaged from the projection 19 of the actuating plate 11, and the latter is released. The tension of the spring 11a moves actuating plate 11 forwardly until dog $18_7$ thereof abuts against the lug 2c of the stem of the key "7." During such advance movement of the actuator 11 from initial position to an advanced position engaging the key, the rack extension 12 of the actuator 11 has turned the pinion 14 and numeral wheel 15 to a position in which "7" appears in the sight 3.

When the key reaches its lowest position, the latch plate 13 moves forwardly under tension of the spring associated therewith and latches the depressed key by means of the dog 21 engaging the hook of the stem portion 2a before projection 13a engages pawl 16c again.

In order to return the actuating plate 11, without influencing the set position "7" of the counter wheel 15, to normal position, the drive key 6 is depressed (Figs. 3 and 7). The rails 29 and 32 are thereby moved forwardly by the elements 23, 24, 26—28, 30 and 31, and the accumulator shaft 34 raised by the rollers 35 and 35a so that the pinions 14 are disengaged from the racks 12 permitting the latter and the plates 11 to return to normal position. Upon raising the accumulator shaft 34, the pinions 14 are locked by the prongs 39 of the transverse plate 38 so that during disengagement the pinions are secured against rotation. Upon releasing the drive key 6, the pinions 14 again are coupled with the racks 12 of the actuating plates 11 and the machine is conditioned for the next operation.

In order to reduce the length of the machine as much as feasible, the key-stem lugs and the dogs of the plates 11 are so adapted and disposed that the distance covered by the latter and their rack extensions 12 is only a fraction of the distance between the first and the last key of a column. In the present example the total distance covered by a plate 11 and extension 12 is approximately equal to twice the distance between two adjacent keys. The distance corresponding to the ratching unit thus is not equal to the distance between two keys, but only 2/9 thereof.

According to the present invention, then, the dogs $18_1$—$18_9$ of the actuating plate 11 (Fig. 10) are not aligned in one and the same plane, but are partly staggered laterally, viz. as follows:

The dogs $18_1$—$18_4$ are aligned in one and the same plane, and cooperate with the lugs 2cd of the stems of the keys "1"—"4" in that the dog $18_1$ may abut against the lug 2cd of the key "1," the dog $18_2$ against the lug 2cd of key "2" etc. (Fig. 4a).

Since, however, in the arrangement under discussion, the next lug $18_5$ still lies in front of the key "4," a by-pass must be provided for. To this end, the lug $18_5$ is laterally offset (Figs. 2 and 10). In such case, however, also the key "5" must be provided with a correspondingly offset lug 2c (Fig. 4b). The lug $18_6$ and the corresponding key-lug need not be offset. The lug $18_7$ and the corresponding lug 2c of the key stem are offset again, while the lug $18_8$ and the corresponding lug 2cd are not offset.

The lug $18_8$ which corresponds to the last key "9," does not abut against the key-stem lug thereof, but against a transverse rod 17. The decimal, or tens transfer devices are:

Each counter wheel 15 is provided with a laterally projecting pin or stud 40 (Figs. 2, 7 and 13) which moves into the range of a lever 41 pivoted on the bearing plate 8. The lever 41 coacts with a long spring-loaded lever 42 (Figs. 7 and 18), pivoted at 43 on the bearing plate 8. The lever 42 is provided with a lateral lug 44 slotted at 44a (Fig. 14). The actuating plate 11 of the next higher denominational order is guided in the slot 44a and such plate 11 is rockable about its lower edge. For a decimal transfer from the zero position, the pawl finger 16b enters into play, which is disposed immediately beside the pawl finger 16a and set back therefrom. For a decimal transfer from a depressed value, special lugs 2b provided on the key stems, adjacent to the lugs 2c or 2cd, are brought into action, which are bent forwardly from the lugs 2, 2c or a 2a, 2cd by a distance corresponding to a digital unit. The studs 40 are so disposed on the counter wheels 15 that they are in front of the levers 41 when "0" is visible through the sight 3.

The tens transfer takes place as follows:

When the numeral wheel 15 rotates, the transfer pin 40 engages the lever 41. Lever 41 engaging the end portion 42a of lever 42 pivots lever 42 about its pivoting point 43 so that the lateral lug 44 moves in the direction of the arrow in Figures 7 and 18, tilting the actuating plate 11 of the next higher denominational order which is engaged in a slot 44a in lug 44 (Fig. 14). When the transfer pin 40 is disengaged from lever 41 during further rotation of the numeral wheel 15, a spring 42b secured by a rivet 42c to bearing plate 8, urges lever 42 to return to its normal position so that the actuating bar also is urged to return to its normal upright position.

When the actuating plate 11 of the next higher order is engaged by one of its lugs $18_1$—$18_8$ with a lug on a key stem, i. e. when a key has been depressed, the plate 11 with its lug will slide off the corresponding key-lug 2c or 2cd, because of the lateral tilting, and will move against the lug 2b lying forward therefrom, thus actuating the counter wheel 15 of the next higher denominational order for one additional digital unit.

When, however, the actuating plate 11 of the next higher denominational order is locked in normal position by the pawl finger 16a, then the lateral rocking or tilting of the plate by means of the lever 42 and lug 44, will cause the removal of the projection 19 from the pawl finger 16a and onto the pawl finger 16b, thus initiating movement of the counter wheel 15 for one digital unit.

In order to positively effect the setting of a counter wheel 15 when depressing an associated key, all the other keys of the column involved must be returned to normal position. This takes place automatically. Upon depressing a key, the key latch plate 13 is moved rearwardly slightly by the incline 21a of the corresponding dog 21, until the hook-lug 2a of the key stem is caught by the dog 21 of the plate 13. The rearward movement is sufficient to release any other keys previously latched by the dogs 21 and permit them to return to normal position under the action of their springs 45 out of range of the dogs $18_1$—$18_8$ of the actuating plate 11.

The entire keyboard is cleared in a similar manner, by the following device:

A clearing bar 49 (Fig. 2) is pivoted on the pins 48 in the case 1 and extends transversely thereof in front of the key latch plates 13. The bar 49 is urged by a spring (not shown) against a push-button 50 mounted in the front wall of the case 1.

When the entire key board is to be cleared, the push-button 50 is pushed inwardly. The bar 49 is moved against the front edges of the key latch plates 13 and pushes them rearwardly, upon which, in a manner similar to that described above for clearing the keys of one column, any keys latched by the plates 13 will be released and return to normal position under the action of their springs 45. The keyboard is cleared each time the actuating plates 11 are returned to normal positions by the drive key 6. The following means are provided for this purpose in combination with the drive mechanism.

An arm 51 (Fig. 2) is provided on the transverse clearing bar 49, and projects into the path of the transverse main bar 33 which is actuated by the drive key 6. When the main bar 33 is moved rearwardly upon depressing the drive key 6, in the manner described, in order to move the actuating plates 11 to normal position, the arm 51 is rocked upwardly and the transverse rail 49 is moved against the key latch plates 13 which move rearwardly and release any latch keys.

A further possibility of clearing the key board by means of the drive key 6, when the actuating plates 11 are moved into normal position, is afforded by the following means.

As described above, the key latch plates are supported in V-notches 9*b* of the transverse angle bars 9 and 10, wherein they are laterally rockable or tiltable about their bottom edge. The latch plates 13, are guided also in notches of a transversely movable rail 52 (Fig. 7) which at one end 52*a* lies within the range of an arm of a bell-crank lever 53 pivoted on the bearing plate 8. The other end of the lever 53 projects into the path of a dog 54 (Fig. 15) provided on the guide rail 32.

When the drive key 6, for the purpose of restoring the actuating plates 11 to normal position, is depressed, the rails 29 and 32 move rearward. The dog 54 then contacts the arm of the lever 53, the other arm of which moves the transverse rail 52, whereby the key latch plates 13 guided in the notches of the latter are laterally rocked or tilted in the V-notches of the fixed bars 9 and 10. The dogs 21 of the latch plates 13 are then laterally removed from the hooks 2*a* of the latched keys 2, and the keys return to normal position under the action of their springs 45. The machine is then conditioned for the following operation.

The following mechanism is provided for resetting the number wheels 15 to zero.

A zeroing key 4 (Figs. 1, 3, 16 and 18) is provided whose stem has an incline 55 (Fig. 16) which coacts with a spring-loaded lever 57 pivoted at 56 (Fig. 18) in the bearing plate 8. The lever 57 engages the plate 38 by a nose 58. The plate 38 is horizontally displaceable by means of a longitudinal slot 60 therein in the direction of the arrows. Lugs 61 (Figs. 13, 18) are provided on the counter wheels 15, which cooperate with the prongs 39 of the plate 38 when shifted.

A transversely movable bar 63 is mounted on the bearing plate 8 within range of the pawls 16, and is provided with barbs 64 (Fig. 17) pressed out therefrom. The end 65 of the bar 63 contacts the lever 66 which is operatively connected to the zeroing key 4 (Figs. 16, 18).

When the zeroing key 4 is depressed, the levers 57 and 66, and also the plate 38 with the prongs 39, are moved so that the latter are brought within range of the counter-wheel lugs 61.

At the same time, the movable transverse bar 63 also has been displaced by the lever 66 and thus raises the pawls 16 so that the actuating plates 11, which previously had been moved into normal position by the drive key 6, are unlatched and move forwardly. The counter wheels 15 thus are turned, by means of the pinions 14, until their lugs 61 abut against the prongs 39. The said lugs 61 are so disposed on the counter wheels that "0" appears in the sight 3 when they are stopped by the prongs 39.

As seen in Fig. 8, the notch 13*c* is shorter than the notch 13*c* between the key detents 21 in the key latch plate 13. Such an arrangement serves to prevent the second stop of the pawls 16 blocking the way when the actuating plate 11 is tilted transversely for initiating the decimal transfer from 1 position.

Assuming that the key with the digit "1" is depressed, the projection 19 of the actuating plate 11 moves forwardly by one unit of distance, thus being laterally aligned with the pawl finger 16*b*. When, now, a decimal transfer is to take place from the next lower order, the actuating plate 11 is supposed to tilt laterally. But the pawl finger 16*b* would either prevent the lateral displacement of the projection 19, or block it, so that the actuating plate could not move a unit distance. Such obstacle is eliminated by the arrangement described above, since on an advance of the plate 13, the pawl 16 is raised. The plate 13, on account of the notch 13*c*, cannot be moved back so far as to bring about a blocking by the pawl finger 16*b*, until the restoring key is depressed again.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. In a calculating machine, a multi-order keyboard, each order having an ordinal complement of keys; a multi-denominational accumulator having an ordinal series of numeral wheels; a differential actuator operatively connected to each numeral wheel and cooperable with the complement of keys of a corresponding order, said actuator being longitudinally slidable and laterally tiltable about its longitudinal axis between a normal and tens transfer position; means supporting said actuator for such sliding and tilting movement; spring means urging said actuators longitudinally from an initial into an advanced position into engagement with a depressed key; a main stop member engageable with said actuator in initial position when said actuator is in normal position to latch said actuator in initial postion against the action of said spring means; an auxiliary stop member positioned laterally and in advance of said main stop member and adapted to cooperate with said actuator in tilted tens transfer position so as to arrest and latch said actuator against said spring means a unit distance in advance of said initial position; an ordinal key latch plate adapted to latch a depressed key in fully depressed position and to release any depressed keys in the same order; means connecting said key latch plate and said main stop member to release said member from said actuator when a key is depressed; a plurality of differentially spaced projections on said actuator; each key including a first abutment engageable by a corresponding projection on said actuator when the key is depressed and said actuator is in its normal position, and a second abutment positioned laterally and longitudinally in advance of said first abutment by a unit differential distance and engageable by said corresponding projection on said actuator in transfer tilted position; manually operable drive means normally in an advanced position and operable to restore said actuators to initial position for latching engagement with said main stop members; means operable by said drive means for disengaging said numeral wheels from said actuators during the restoring movement of the latter; pawl means engageable with said numeral wheels in disengaged position to prevent movement of said wheels during restoring movement of said actuators; a tens transfer pin on each numeral wheel; a lever system connected to each actuator and cooperable each with the transfer pin on the numeral wheel of next lower order to tilt said actuator from normal to tens transfer position when the numeral wheel of lower order passes through zero; such tilting resulting in a unit advance of said higher order actuator by disengagement from said main stop member and engagement with said auxiliary stop member if said actuator is in its initial position and by disengagement from said first abutment and engagement with said second abutment of a depressed key if said actuator is in an advanced position in engagement with said key.

2. In a calculating machine, a multi-order keyboard, each order having an ordinal complement of keys; a multi-denominational accumulator having an ordinal series of numeral wheels; a differential actuator cooperable with the complement of keys of a corresponding order, said actuator being longitudinally slidable and laterally tiltable about its longitudinal axis between a normal and tens transfer position, and operatively connected to the associated numeral wheel while longitudinal sliding from an initial to an advanced position; means supporting said actuator for such sliding and tilting movement; spring means urging said actuators longitudinally from an initial into an advanced position into engagement with a depressed key; a main stop member engageable with said actuator in initial position when said actuator is in normal position to latch said actuator in initial position against the action of said spring means; an auxiliary stop member positioned laterally and in advance of said main stop member and adapted to cooperate with said actuator in tilted tens transfer position so as to arrest and latch said actuator against said spring means a unit distance in advance of said initial position; an ordinal key latch plate adapted to latch a depressed key in fully depressed position and to release any depressed keys in the same order; means connecting said key latch plate and said main stop member to release said member from said actuator when a key is depressed; a plurality of differentially spaced projections on said actuator; each key including an abutment engageable by a corresponding projection on said actuator when the key is depressed and said actuator is in its normal position; manually operable drive means normally in an advanced position and operable to restore said actuators to initial position for latching enagement with said main stop members; means operable by said drive means for disengaging said numeral wheels from said actuators during the restoring movement of the latter; a tens transfer pin on each numeral wheel; a lever system connected to each actuator and cooperable each with the transfer pin on the numeral wheel of next lower order to tilt said actuator from normal to tens transfer position when the numeral wheel of lower order passes through zero; such tilting resulting in a unit advance of said higher order actuator by disengagement from said main stop member and engagement with said auxiliary stop member if said actuator is in its initial position; and stop means engaging said higher order actuator in said tilted transfer position thereof and limiting to one unit differential distance advance movement thereof under the action of said spring means when said actuator is tilted out of engagement with said abutment on said key.

3. In a calculating machine, a multi-order keyboard, each order having an ordinal complement of keys; a multi-denominational accumulator having an ordinal series of numeral wheels; a differential actuator cooperable with the complement of keys of a corresponding order, said actuator being longitudinally slidable and laterally tiltable about its longitudinal axis between a normal and tens transfer position, and operatively connected to the associated numeral wheel while longitudinally sliding from an initial to an advanced position; means supporting said actuator for such sliding and tilting movement; spring means urging said actuators longitudinally from an initial into an advanced position into engagement with a depressed key; a main stop member engageable with said actuator in initial position when said actuator is in normal position to latch said actuator in initial position against the action of said spring means; an ordinal key latch plate adapted to latch a depressed key in fully depressed position and to release any depressed keys in the same order; means connecting said key latch plate and said main stop member to release said member from said actuator when a key is depressed; a plurality of differentially spaced projections on said actuator; each key including an abutment engageable by a corresponding projection on said actuator when the key is depressed and said actuator is in its normal position, and a second abutment positioned laterally and longitudinally in advance of said first abutment by a unit differential distance and engageable by said corresponding projection on said actuator in transfer tilted position; manually operable drive means normally in an advanced position and operable to restore said actuators to initial position for latching engagement with said main stop members; means operable by said drive means for disengaging said numeral wheels from said actuators during the restoring movement of the latter; a tens transfer pin on each numeral wheel; a lever system connected to each actuator and cooperable each with the transfer pin on the numeral wheel of next lower order to tilt said actuator from normal to tens transfer position when the numeral wheel of lower order passes through zero; such tilting resulting in a unit advance of said higher order actuator by disengagement from said first abutment and engagement with said second abutment of a depressed key if said actuator is in an advanced position in engagement with said key; and stop means engaging said higher order actuator in said tilted transfer position thereof and limiting to one unit differential distance advance movement thereof under the action of said spring means when said actuator is tilted out of engagement with said main stop member while in said initial position.

4. In a calculating machine, a multi-order keyboard, each order having an ordinal complement of keys; a multi-denominational accumulator having an ordinal series of numeral wheels; a differential actuator operatively connected to each numeral wheel and cooperable with the complement of keys of a corresponding order, said actuator being longitudinally slidable and laterally tiltable about its longitudinal axis between a normal and tens transfer position; means supporting said actuator for such sliding and tilting movement; spring means urging said actuators longitudinally from an initial into an advanced position into engagement with a depressed key; a main stop member including an abutment engageable with said actuator in initial position when said actuator is in normal position to latch said actuator in initial position against the action of said spring means; an ordinal key latch plate adapted to latch a depressed key in fully depressed position and to release any depressed keys in the same order; means connecting said key latch plate and said main stop member to release said member from said actuator when a key is depressed; a plurality of differentially spaced projections on said actuator; each key including an abutment engageable by a corresponding projection on said actuator when the key is depressed and said actuator is in its normal position; manually operable drive means normally in an advanced position and operable to restore said actuators to initial position for latching engagement with said main stop members; means operable by said drive means for disengaging said numeral wheels from said actuators during the restoring movement of the latter; a tens transfer projection on each numeral wheel; a lever system connected to each actuator and cooperable each with the transfer projection on the numeral wheel of next lower order to tilt said actuator from normal to tens transfer position when the numeral wheel of lower order passes through zero; and stop means engaging said higher order actuator in said tilted transfer position thereof and limiting to one unit differential distance advance movement thereof under the action of said spring means when said actuator is tilted out of engagement with one of said abutments.

CHI LIANG CHO.

REFERENCES CITED

The following references are of record in the file of this patent:

UNITED STATES PATENTS

| Number | Name | Date |
|---|---|---|
| 773,100 | Rabich et al. | Oct. 25, 1904 |
| 909,866 | Carroll | Jan. 19, 1909 |
| 1,293,544 | Quentell | Feb. 4, 1919 |
| 1,386,022 | Peters | Aug. 2, 1921 |
| 1,458,642 | Collins | June 12, 1923 |
| 2,052,905 | Sturm | Sept. 1, 1936 |
| 2,410,823 | Laiho | Nov. 12, 1946 |